United States Patent
Natter et al.

(10) Patent No.: US 8,956,190 B2
(45) Date of Patent: Feb. 17, 2015

(54) SUBMERGIBLE FUSED RECEPTACLE ASSEMBLY FOR A VEHICLE CHARGING INLET

(71) Applicant: Lear Corporation, Southfield, MI (US)

(72) Inventors: Brantley Natter, Brighton, MI (US);
Slobodan Pavlovic, Novi, MI (US);
Juan Lopez, Madison Heights, MI (US);
Gerhard Drescher, Grosse Pointe Park, MI (US)

(73) Assignee: Lear Corporation, Southfield, MI (US)

( * ) Notice: Subject to any disclaimer, the term of this patent is extended or adjusted under 35 U.S.C. 154(b) by 37 days.

(21) Appl. No.: 13/938,619

(22) Filed: Jul. 10, 2013

(65) Prior Publication Data

US 2014/0038463 A1 Feb. 6, 2014

Related U.S. Application Data

(60) Provisional application No. 61/678,787, filed on Aug. 2, 2012.

(51) Int. Cl.
| | |
|---|---|
| *H01R 13/00* | (2006.01) |
| *H01R 43/00* | (2006.01) |
| *B60L 3/00* | (2006.01) |
| *B60L 3/04* | (2006.01) |
| *B60L 11/18* | (2006.01) |

(52) U.S. Cl.
CPC ............... *H01R 13/00* (2013.01); *H01R 43/00* (2013.01); *B60L 3/00* (2013.01); *B60L 3/0069* (2013.01); *B60L 3/04* (2013.01); *B60L 11/1818* (2013.01); *B60L 11/1825* (2013.01); *B60L 2230/12* (2013.01); *Y02T 10/7088* (2013.01); *Y02T 10/7005* (2013.01); *Y02T 90/121* (2013.01); *Y02T 90/14* (2013.01); *Y02T 90/128* (2013.01)

USPC ............ 439/620.34; 439/620.26; 439/620.29; 439/34

(58) Field of Classification Search
USPC ............... 439/620.3, 620.22, 620.21, 620.01, 439/225, 620.26–620.34, 34
See application file for complete search history.

(56) References Cited

U.S. PATENT DOCUMENTS

| | | | |
|---|---|---|---|
| 4,484,185 A * | 11/1984 | Graves | 340/656 |
| 6,371,768 B1 * | 4/2002 | Neblett et al. | 439/34 |
| 7,794,280 B1 | 9/2010 | Markyvech | |
| 7,878,866 B1 * | 2/2011 | Kwasny et al. | 439/695 |
| 8,123,535 B1 * | 2/2012 | Yeon | 439/101 |
| 8,202,124 B1 | 6/2012 | Natter et al. | |
| 8,328,581 B2 | 12/2012 | de Chazal | |
| 2011/0045343 A1 * | 2/2011 | Barkoczi et al. | 429/178 |
| 2011/0151719 A1 * | 6/2011 | DeWitte | 439/620.26 |

* cited by examiner

*Primary Examiner* — Dameon E Levi
*Assistant Examiner* — Paul Baillargeon
(74) *Attorney, Agent, or Firm* — Brooks Kushman P.C.

(57) ABSTRACT

A receptacle assembly for a vehicle charging inlet is provided having a base with apertures formed through, an external receptacle extending from the base in a first direction for receiving a charging cable connector, and an internal receptacle extending from the base in a second direction, opposite the first direction, for receiving a plurality of wires from a wire harness. The internal receptacle defines an internal cavity having at least one terminal receptacle formed about one of the apertures and at least one fuse receptacle. The internal receptacle includes wire channels for routing a wire having an inline fuse from the terminal receptacle to the fuse receptacle and from the fuse receptacle to a wire outlet. The inline fuse is received by the fuse receptacle.

20 Claims, 4 Drawing Sheets

SUBMERGIBLE FUSED RECEPTACLE ASSEMBLY FOR A VEHICLE CHARGING INLET

CROSS-REFERENCE TO RELATED APPLICATIONS

This application claims the benefit of U.S. provisional Application No. 61/678,787, filed Aug. 2, 2012, the disclosure of which is incorporated in its entirety by reference herein.

TECHNICAL FIELD

The present disclosure relates to a vehicle-mounted receptacle assembly for a charging inlet that connects a charging cable connector for receiving electrical energy from an external power supply, and more particularly, to a vehicle charging inlet with integrated fuses that is submergible.

BACKGROUND

Vehicle charging inlets include receptacle assemblies for connecting a charging cable from an external power source to a vehicle harness connected directly or indirectly to a vehicle battery. Amongst other circuits, the interface between the charging cable and the receptacle assembly connects the vehicle battery to the electrical grid using AC power line wires to facilitate battery charging. The receptacle assembly can include an internal printed circuit board (PCB) for connecting wires from the vehicle harness to male terminals or pins, which mate with corresponding terminals in the charging cable connector. To provide overcurrent protection at the vehicle side, the vehicle harness may include fuses connected to the wire harness' AC power lines. The fuses help protect vehicle wiring during long-term, unattended charging operations. The fuses are typically connected to the AC power lines downstream from the charging inlet. In some applications, the fuses are integrated with the PCB at the charging inlet.

The charging receptacle is exposed to harsh automotive environments (e.g., water, salt, hot and cold temperatures, sunlight, etc.), particularly when the vehicle is driven, and needs to be sealed to protect internal high voltage (HV) circuits from contamination. Because the HV circuits require substantial isolation between ground, neutral and phase lines, any internal circuit design at the charging receptacle needs to include complete sealing from surrounding environments. The PCB is one flat plane with little to no isolation of components. Utilization of the PCB or some other circuit design with traces (e.g., system of bus bars, flexible circuit, or the like) requires the insulator applied during the manufacturing process (e.g., conformal coating, potting materials, etc.) to be void of micro-contamination. If water gets into the receptacle assembly, the internal circuit provides a water leak path at the pins potentially creating short circuits across the PCB. Indeed, under HV conditions, the presence of humidity can bridge the short distances between traces and create a high resistive short condition.

Moreover, during the charging process, the fuses heat up and are cooled down when charging is completed. The fluctuation in fuse temperatures creates thermal stress to the fuse carriers (e.g., PCB, busbar system, or flexible circuit) and to the insulating potting material possibly causing potential separation of the materials and potential leak paths.

SUMMARY

One or more embodiments of the present disclosure are directed to a receptacle assembly for a vehicle charging inlet. The receptacle assembly may include a base for mounting to a vehicle panel, the base having a first side facing a first direction, a second side facing a second direction opposite the first direction, and apertures formed through for receiving terminals. The receptacle assembly may further include an external receptacle extending from the base in the first direction for receiving a charging cable connector. At least one terminal receptacle may extend from the base in the second direction. The terminal receptacle may be formed about one of the apertures and define a terminal cavity. At least one fuse receptacle may extend from the base in the second direction and define a fuse cavity. The receptacle assembly may further include at least one terminal having a proximal end disposed in the terminal receptacle and a distal end extending from the base in the first direction within the external receptacle for connecting with a mating terminal. A wire may be attached to the proximal end of the terminal. The wire may include an inline fuse attached directly thereto, which may be disposed in the fuse receptacle.

According to one or more embodiments, the inline fuse may include a lead directly connected to the proximal end of the terminal. Alternatively, the wire may include a first wire portion and a second wire portion separated by the inline fuse. The inline fuse may include a first lead attached to the first wire portion and a second lead attached to the second wire portion. The second wire portion may connect the inline fuse to the proximal end of the terminal. The receptacle assembly may connect the at least one terminal and inline fuse directly to a vehicle harness without an internal printed circuit board, bus bar, or flexible circuit.

A fuse cover may enclose the inline fuse in the fuse receptacle. The receptacle assembly may include wire channels formed in second side for routing the wire from the terminal receptacle to a wire harness. Moreover, an internal receptacle may extend from the base in the second direction and may receive a plurality of wires from the wire harness. The internal receptacle may define an internal cavity within which the terminal receptacle, fuse receptacle and wire channels are located.

One or more additional embodiments of the present disclosure are directed to a receptacle assembly for a vehicle charging inlet including a flange for mounting to a vehicle panel and a base having a first side facing a first direction, a second side facing a second direction opposite the first direction, and apertures formed through for receiving terminals. An external receptacle may extend from the base in the first direction for receiving a charging cable connector. An internal receptacle may extend from the base in the second direction to receive a plurality of wires from a wire harness. The internal receptacle may define an internal cavity having at least one terminal receptacle formed about one of the apertures and at least one fuse receptacle. Both the terminal receptacle and the fuse receptacle may extend from the base in the second direction. The internal receptacle may include wire channels for routing a wire from the terminal receptacle to the fuse receptacle and from the fuse receptacle to a wire outlet.

The fuse receptacle may include a peripheral wall defining a fuse cavity for receiving an inline fuse. The peripheral wall may have a pair of grooves for receiving a pair of fuse leads. Each groove may be at opposite ends of the fuse receptacle.

The receptacle assembly may further include at least one terminal having a proximal end disposed in the terminal receptacle and a distal end extending from the base in the first direction within the external receptacle for connecting with a mating terminal. A wire including a first wire portion and a second wire portion may be attached to the proximal end of the terminal. An inline fuse, disposed in the fuse receptacle, may separate the first wire portion from the second wire portion. The inline fuse may have a first lead attached to the first wire portion and a second lead attached to the second wire portion. A fuse cover may enclose the inline fuse in the fuse receptacle. The internal receptacle may be filled with potting material and overmolded with the potting material to form a cover enclosing the internal receptacle.

Alternatively, the receptacle assembly may include at least one terminal having a proximal end disposed in the terminal receptacle and a distal end extending from the base in the first direction within the external receptacle for connecting with a mating terminal. An inline fuse may be disposed in the fuse receptacle. The inline fuse may have a first lead and a second lead. The second lead may be attached directly to the proximal end of the terminal. A wire may be attached directly to the first lead and routed through the wire channels to the wire outlet. A fuse cover may enclose the fuse in the fuse receptacle. The internal receptacle may be filled with potting material and overmolded with the potting material to form a cover enclosing the internal receptacle.

One or more additional embodiments of the present disclosure are directed to a method for assembling a wire harness to a receptacle assembly for a vehicle charging inlet. The method may include providing the receptacle assembly having a base with a first side facing a first direction, a second side facing a second direction opposite the first direction, and a plurality of apertures formed therethrough. The receptacle assembly may include a fuse receptacle extending from the base in the second direction. The wire harness may include a plurality of wires, each wire having a terminal attached to a first end of the wire. At least one wire may include an inline fuse attached directly thereto. The method may further include inserting a second end of each wire through one of the apertures and routing at least the wire including the inline fuse through wire channels formed on the second side of the base so that the inline fuse is received by the fuse receptacle.

The method may also include placing a fuse cover over the inline fuse enclosing it in the fuse receptacle. The method may also include attaching the second end of each wire to a connector for connecting the wire harness to a vehicle harness. Further, the receptacle assembly may include an internal receptacle extending from the base in the second direction. The internal receptacle may define an internal cavity within which the fuse receptacle, apertures and wire channels are located. The method may further include depositing potting material into the internal receptacle over the fuse receptacle and plurality of wires and molding the potting material to the receptacle assembly to seal the terminals, the inline fuse, and the plurality of wires to the second side of the base.

DETAILED DESCRIPTION

Figure 1:
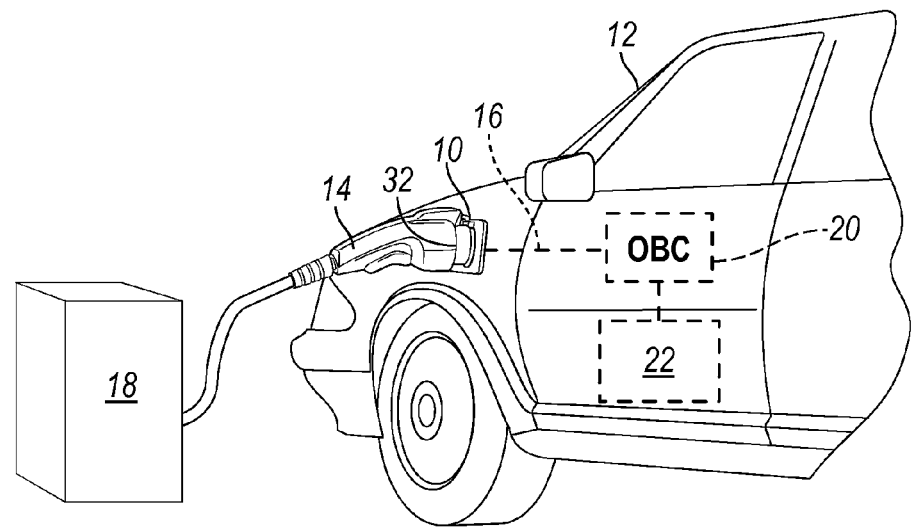
FIG. 1 is a schematic view of a receptacle assembly in accordance with one or more embodiments of the present disclosure, illustrated mounted to a vehicle and connected to a charging cable.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

With reference to FIG. 1, a receptacle assembly 10 is illustrated in accordance with one or more embodiments of the present disclosure. The receptacle assembly 10 is mounted to a vehicle 12 and provides a charging inlet to the vehicle for receiving electrical energy. The receptacle assembly 10 connects a charging cable connector 14 to a vehicle harness 16. The charging cable connector 14 may extend from an external power supply 18 for providing electrical energy. The vehicle harness 16 may connect to an on-board charger (OBC) 20 mounted within the vehicle 12. In turn, the OBC 20 may connect to an energy storage device 22, such as a battery, for storing the electrical energy by charging the energy storage device. The OBC 20 may facilitate and manage the process of charging the energy storage device 22 from the vehicle side.

Figure 2:
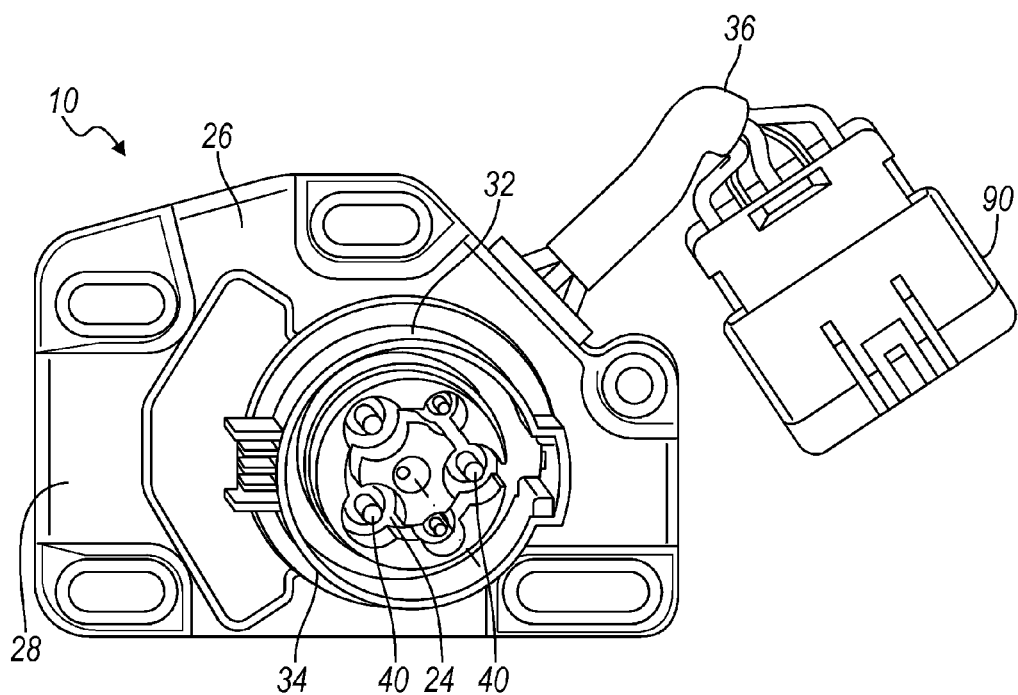
FIG. 2 is a front perspective view of an exemplary receptacle assembly, in accordance with one or more embodiments of the present disclosure.

Referring to FIGS. 1-6, the receptacle assembly 10 may include a base 24 and a flange 26 for mounting to the vehicle 12. The base 24 may include a first side 28 facing a first direction away from the vehicle 12 and a second side 30 facing a second direction, opposite the first direction, toward the vehicle's interior. FIG. 2 illustrates a front view of the receptacle assembly 10. The base 24 may be disposed over an aperture (not shown) formed into an external panel of the vehicle 12. The flange 26 may extend outward from the base 24 as illustrated. The flange 26 may be contoured for mounting to the vehicle 12. The receptacle assembly 10 may also include an external receptacle 32 for receiving the charging cable connector 14. The external receptacle 32 may extend from the base 24 in the first direction away from the vehicle 12. In one or more embodiments, the receptacle assembly 10 may include a lid (not shown) that is pivotally connected to an external surface of the receptacle assembly 10, and disposed over a distal end 34 of the external receptacle 32 for sealing the external receptacle 32. In one or more additional embodiments, the lid may be pivotally connected to another vehicle surface, while still being disposed over the distal end 34 of the external receptacle 32. Although the external panel is shown in FIG. 1 as being disposed at an exterior surface of the vehicle's body, the external panel may be recessed such that all or at least a portion of the external receptacle 32 is disposed inward of the vehicle's exterior surface.

Figures 3, 7:
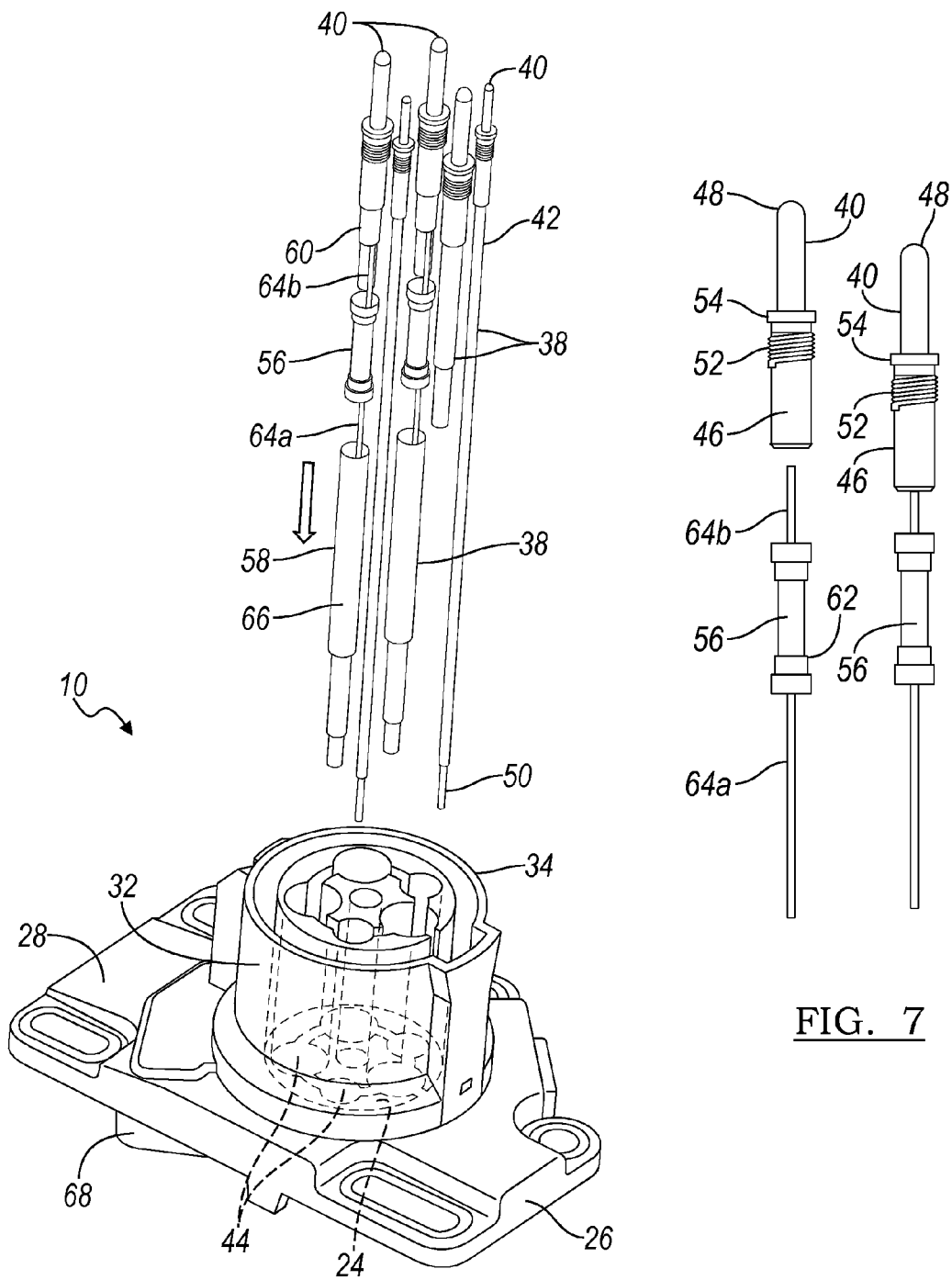
FIG. 3 is an exploded side perspective view of the receptacle assembly of FIG. 2, in accordance with one or more embodiments of the present disclosure.
FIG. 7 is an exploded, close-up view of a terminal showing a connection to a fuse, in accordance with one or more embodiments of the present disclosure.

The receptacle assembly 10 may be attached to the vehicle harness 16 through its own wire harness 36. The wire harness 36 may include a plurality of individual wires 38, which are illustrated in FIG. 3. A terminal 40 may be attached to a first end 42 of each wire 38. A number of apertures 44 may be formed through the base 24 for receiving the terminals 40. Each terminal 40 may include a proximal end 46 and a distal end 48 (shown in FIGS. 3 and 7). The proximal end 46 of each terminal 40 may be attached to the wire 38 and received by one of the apertures 44 formed in the base 24. The distal end 48 of each terminal 40 may extend externally from the base 24 in the first direction within the external receptacle 32. In this manner, the distal end 48 of each terminal 40 may be configured to connect with a mating terminal (not shown) of the charging cable connector 14.

The interface between the receptacle assembly 10 and the charging cable connector 14 may be specified in an effort to standardize the connection throughout the electric vehicle industry. For example, the Society of Automotive Engineers ("SAE") has specified such an interface in SAE J1772, which is hereby incorporated by reference. According to one or more embodiments, the interface between the receptacle assembly 10 and the charging cable connector 14 may include five male terminals 40 ("pins"). The interface specified in SAE J1772 includes five circuits, which correspond to the following functions: AC Power Line 1 (L1), AC Power Line 2 (L2, N), chassis ground, control pilot, and proximity detection. However, the receptacle assembly 10 is not limited by this SAE specification and may be utilized for applications specifying other interface requirements.

Referring to FIGS. 3 and 7, the proximal end 46 of the terminal 40 may be attached to the wire 38 by mechanical means, such as crimping. Once the wires are attached to the terminals, a second end 50 of each wire 38 may be inserted through the apertures 44 after being fed through the external receptacle 32 from the first side 28. Each terminal 40 may include features for attaching to the receptacle assembly 10. According to one or more embodiments, peripheral barbs 52 may extend peripherally from an intermediate portion of the terminal 40, between the proximal end 46 and the distal end 48. The barbs 52 may extend beyond the inner diameter of the apertures 44 in the base 24 for providing an interference fit between the terminal 40 and the base 24. This interference fit helps retain the terminals 40 in the receptacle assembly 10. An end stop 54 may also be formed in an intermediate portion of the terminal 40, between the barbs 52 and the distal end 48. The end stop 54 may extend radially beyond the barbs 52 for contacting the base 24 and limiting an insertion depth of the terminal 40.

Each AC power line wire may include an inline fuse 56 connected directly to the wire 38. The inline fuse 56 may be disposed along the wire 38 at a location proximate the terminal 40 so that it may be received by the receptacle assembly 10 and, thus, integrated with the vehicle charging inlet. The fuses protect all the wiring downstream (i.e., between the fuses and the OBC and/or battery). Thus, integrating the power line fuses at the charging inlet—where the current is received, rather than further downstream in the vehicle harness 16—can provide optimal overcurrent protection.

According to one or more embodiments, the inline fuse 56 may bisect the wire 38, separating the wire 38 into a first wire portion 58 and a second wire portion 60. The fuse 56 may include a fuse body 62 and a pair of leads 64. A first lead 64a may be electrically connected to the first wire portion 58 and a second lead 64b may be electrically connected to the second wire portion 60. The second wire portion 60 may connect the inline fuse 56 to the terminal 40. The first wire portion 58 may connect to the vehicle harness 16. The leads 64 may be attached to the wire 38 using a welding process, such as resistance welding or ultrasonic welding, though other forms of attachment are contemplated. The wire 38 may include heat shrink 66 provided over exposed wire leads after welding.

According to one or more additional embodiments, the inline fuse 56 may be directly connected to the terminal 40, as illustrated in FIG. 7. In this manner, the second lead 64b may form the first end 42 of the wire 38 and may be attached directly to the proximal end 46 of the terminal 40 by mechanical means, such as crimping. The first lead 64a may be attached to the wire 38 as described above.

Figure 4:
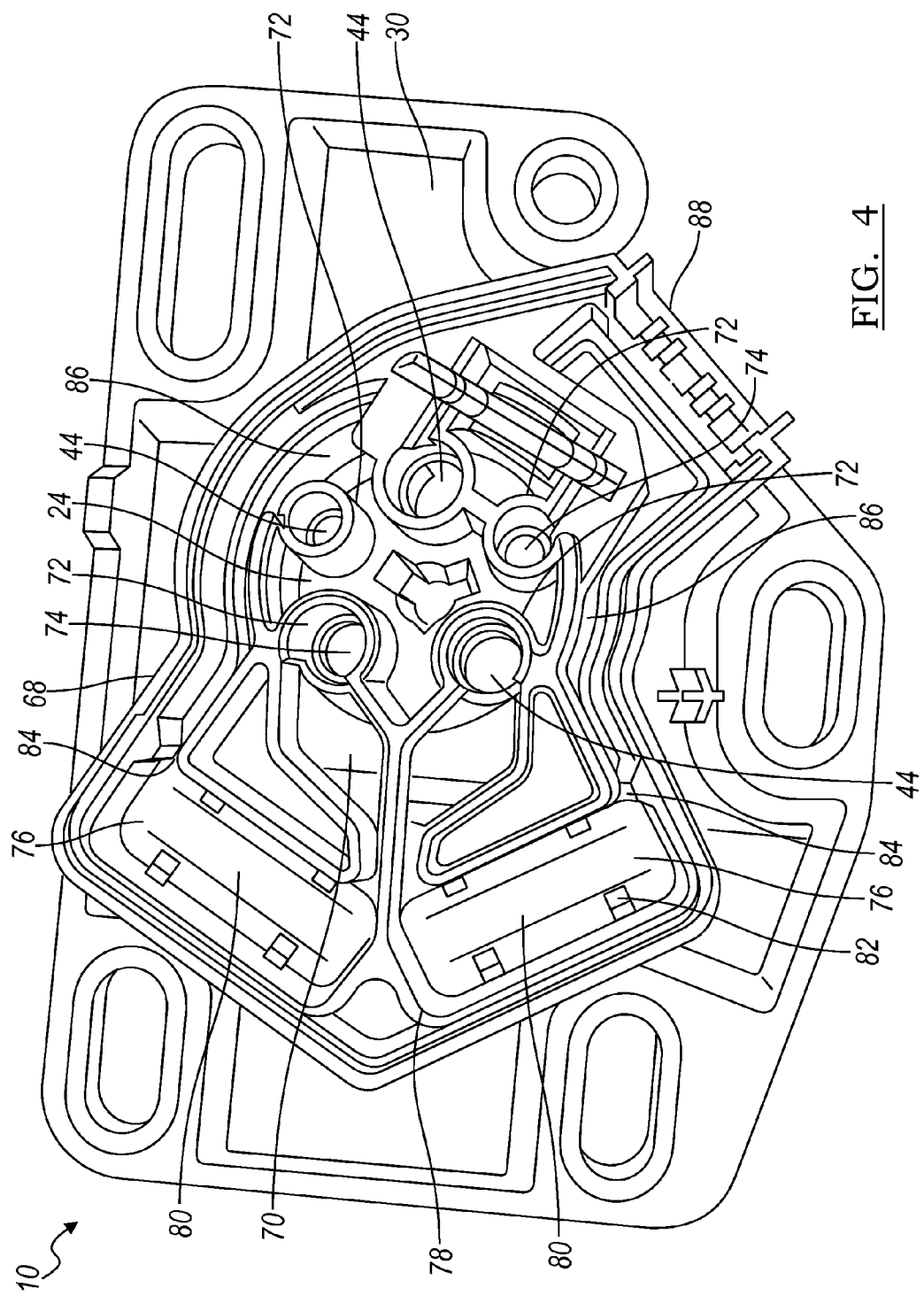
FIG. 4 is a rear perspective view of the receptacle assembly of FIG. 2 without electrical components, in accordance with one or more embodiments of the present disclosure.
Figure 5:
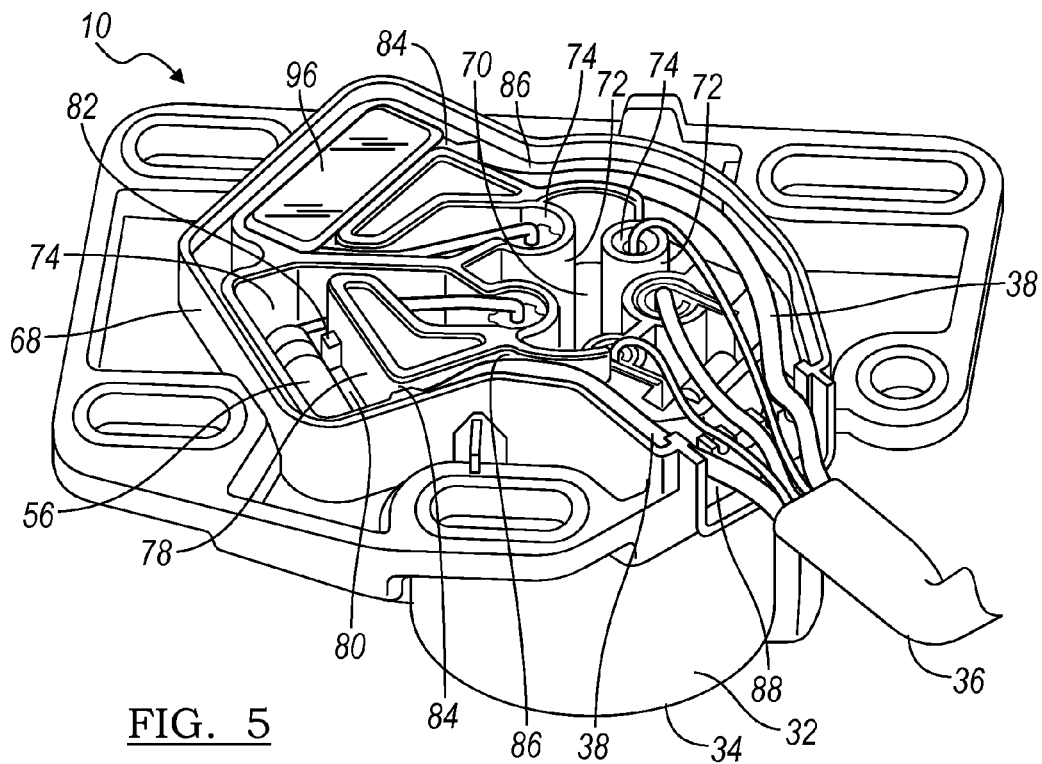
FIG. 5 is a rear perspective view of the receptacle assembly of FIG. 2 with electrical components, in accordance with one or more embodiments of the present disclosure.
Figure 6:
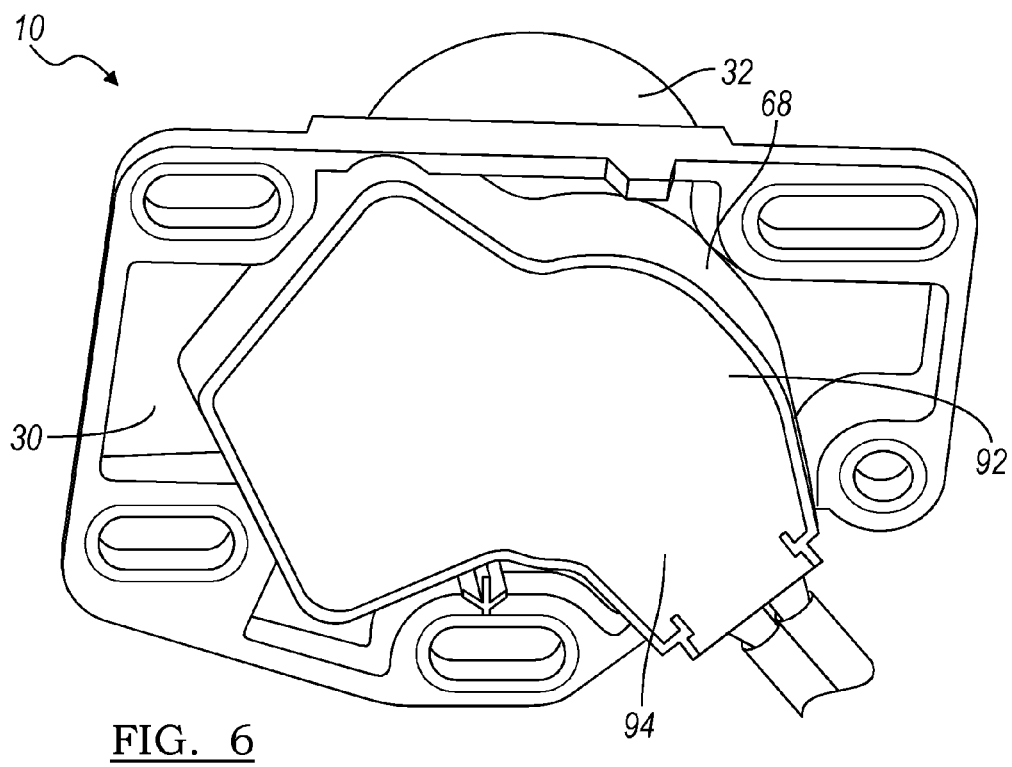
FIG. 6 is another rear perspective view of the receptacle assembly of FIG. 2 after potting, in accordance with one or more embodiments of the present disclosure.

FIGS. 4-6 illustrate a rear view of the receptacle assembly 10. As shown, the receptacle assembly 10 may further include an internal receptacle 68. The internal receptacle 68 may extend from the base 24 in the second direction towards the interior of the vehicle 12. The internal receptacle 68 may define an internal cavity 70 for receiving the plurality of wires 38 attached to the terminals 40 and fed through the apertures 44 from the first side 28. Within the internal cavity 70, the receptacle assembly 10 may further include a plurality of terminal receptacles 72 for supporting the terminals 40. The terminal receptacles 72 may likewise extend from the base 24 in the second direction toward the interior of the vehicle 12. Each terminal receptacle 72 may be formed about and generally coaxial with one of the apertures 44. Each terminal receptacle 72 may define a terminal cavity 74 for receiving the proximal end 46 of one of the terminals 40.

The receptacle assembly 10 may also include at least one fuse receptacle 76 for supporting the inline fuses 56. The fuse receptacle 76 may also be disposed within the internal cavity 70 of the internal receptacle 68 and may likewise extend from the base 24 in the second direction toward the interior of the vehicle 12. The fuse receptacle 76 may include a peripheral wall 78 defining a fuse cavity 80 for receiving the inline fuse 56. In particular, the fuse receptacle 76 may include a mount 82 or similar support feature within the fuse cavity 80 for receiving the fuse body 62. A pair of grooves 84 may be formed in the peripheral wall 78, each at substantially opposite ends of the fuse receptacle 76, for receiving the leads 64 of the fuse 56. The mount 82 and grooves 84 may also assist in locating the fuse 56 during assembly.

The internal receptacle 68 may include a number of wire channels 86 for routing the individual wires 38 from the terminal receptacles 72 to a wire outlet 88 where they can be formed into the wire harness 36. Each AC power line wire including the inline fuse 56 may be guided by the wire channels 86 from the terminal receptacle 72 to the fuse receptacle 76 and then to the wire outlet 88. As shown, the wire harness 36 may include a connector 90 for mating with another connector (not shown) attached to the vehicle harness 16. Once the wires 38 are positioned in the internal receptacle 68, the second end 50 of each wire 38 may be attached to the connector 90 in a known fashion.

Additionally, the electrical components within the internal receptacle 68 (e.g., the wires 38, the inline fuses 56, and the proximal end 46 of the terminals 40) may be encapsulated by a molded thermoplastic material 92 using a potting process (FIG. 6). The molded potting material 92 may help insulate and seal the electrical components from moisture and mechanical damage. Accordingly, the potting material 92 may be deposited into the internal receptacle 68 over the electrical components. Next, the receptacle assembly 10 may be placed in a mold so that the potting material 92 is molded to the receptacle assembly forming a cover 94 enclosing the internal receptacle 68. The wire channels 86, terminal receptacles 72 and fuse receptacles 76 formed in the internal receptacle 68, together with the potting material 92, provide isolation between the individual wire circuits.

According to one or more embodiments, the fuse receptacle 76 may include a fuse cover 96 that may be placed over the fuse 56 during assembly before the internal receptacle 68 is overmolded with the potting material 92, as illustrated in FIG. 5. By enclosing the fuse 56 within the fuse receptacle 76, the fuse cover 96 can provide and maintain an air gap around the fuse 56 to prevent the potting material 92 from acting as a heat sink. Although only one fuse cover 96 is shown in FIG. 5 for illustrative purposes, a fuse cover may be employed with each fuse receptacle 76.

Integrating the fuses 56 in-line with the wires 38 and isolating each wire circuit can provide better performance on water submersion tests, and in real-world conditions where the vehicle 12 may be subjected to excessive moisture, than when connecting all circuits to a printed circuit board (PCB), busbar, or flexible circuit. In particular, short circuits across a PCB created by water leak paths at the pins may be eliminated. Further, the receptacle assembly's internal circuits are unaffected by potential manufacturing impurities that are prevalent during PCB manufacture.

While exemplary embodiments are described above, it is not intended that these embodiments describe all possible forms of the invention. Rather, the words used in the specification are words of description rather than limitation, and it is understood that various changes may be made without departing from the spirit and scope of the subject matter presented herein. Additionally, the features of various implementing embodiments may be combined to form further embodiments of the present disclosure.

What is claimed is:

1. A receptacle assembly for a vehicle charging inlet comprising:
    a base for mounting to a vehicle panel, the base having a first side facing a first direction, a second side facing a second direction opposite the first direction, and apertures formed through for receiving terminals;
    an external receptacle extending from the base in the first direction for receiving a charging cable connector;
    at least one terminal receptacle extending from the base in the second direction, the terminal receptacle being formed about one of the apertures and defining a terminal cavity;
    at least one fuse receptacle extending from the base in the second direction, the fuse receptacle defining a fuse cavity;
    at least one terminal having a proximal end disposed in the terminal receptacle and a distal end extending from the base in the first direction within the external receptacle for connecting with a mating terminal; and
    a wire attached to the proximal end of the terminal, the wire including an inline fuse attached directly thereto, the inline fuse being disposed in the fuse receptacle.

2. The receptacle assembly of claim 1, wherein the inline fuse includes a lead directly connected to the proximal end of the terminal.

3. The receptacle assembly of claim 1, wherein the wire includes a first wire portion and a second wire portion separated by the inline fuse, the inline fuse including a first lead attached to the first wire portion and a second lead attached to the second wire portion, the second wire portion connecting the inline fuse to the proximal end of the terminal.

4. The receptacle assembly of claim 1, wherein the receptacle assembly connects the at least one terminal and inline fuse directly to a vehicle harness without an internal printed circuit board, bus bar, or flexible circuit.

5. The receptacle assembly of claim 1, further comprising a fuse cover enclosing the inline fuse in the fuse receptacle.

6. The receptacle assembly of claim 1, further comprising wire channels formed in second side for routing the wire from the terminal receptacle to a wire harness.

7. The receptacle assembly of claim 6, further comprising an internal receptacle extending from the base in the second direction that receives a plurality of wires from the wire harness, the internal receptacle defining an internal cavity within which the terminal receptacle, fuse receptacle and wire channels are located.

8. A receptacle assembly for a vehicle charging inlet comprising:
    a flange for mounting to a vehicle panel;
    a base having a first side facing a first direction, a second side facing a second direction opposite the first direction, and apertures formed through for receiving terminals;
    an external receptacle extending from the base in the first direction for receiving a charging cable connector; and
    an internal receptacle extending from the base in the second direction for receiving a plurality of wires from a wire harness, the internal receptacle defining an internal cavity having at least one terminal receptacle formed about one of the apertures and at least one fuse receptacle, both the terminal receptacle and the fuse receptacle extending from the base in the second direction, the internal receptacle including wire channels for routing a wire from the terminal receptacle to the fuse receptacle and from the fuse receptacle to a wire outlet.

9. The receptacle assembly of claim 8, wherein the fuse receptacle includes a peripheral wall defining a fuse cavity for receiving an inline fuse, the peripheral wall having a pair of grooves, each groove at opposite ends of the fuse receptacle, for receiving a pair of fuse leads.

10. The receptacle assembly of claim 8, further comprising:
    at least one terminal having a proximal end disposed in the terminal receptacle and a distal end extending from the base in the first direction within the external receptacle for connecting with a mating terminal;
    a wire including a first wire portion and a second wire portion, the second wire portion attached to the proximal end of the terminal; and
    an inline fuse, disposed in the fuse receptacle, separating the first wire portion from the second wire portion, the inline fuse having a first lead attached to the first wire portion and a second lead attached to the second wire portion.

11. The receptacle assembly of claim 10, further comprising a fuse cover enclosing the inline fuse in the fuse receptacle.

12. The receptacle assembly of claim 10, wherein the internal receptacle is filled with potting material and overmolded with the potting material to form a cover enclosing the internal receptacle.

13. The receptacle assembly of claim 8, further comprising:
    at least one terminal having a proximal end disposed in the terminal receptacle and a distal end extending from the base in the first direction within the external receptacle for connecting with a mating terminal;
    an inline fuse disposed in the fuse receptacle having a first lead and a second lead, the second lead attached directly to the proximal end of the terminal; and a wire attached directly to the first lead and routed through the wire channels to the wire outlet.

14. The receptacle assembly of claim 13, further comprising a fuse cover enclosing the fuse in the fuse receptacle.

15. The receptacle assembly of claim 13, wherein the internal receptacle is filled with potting material and overmolded with the potting material to form a cover enclosing the internal receptacle.

16. A method for assembling a wire harness to a receptacle assembly for a vehicle charging inlet, the method comprising:
providing the receptacle assembly having a base with a first side facing a first direction, a second side facing a second direction opposite the first direction, and a plurality of apertures formed therethrough, the receptacle assembly including a fuse receptacle extending from the base in the second direction;
providing the wire harness including a plurality of wires, each wire having a terminal attached to a first end of the wire, at least one wire including an inline fuse attached directly thereto;
inserting a second end of each wire through one of the apertures; and
routing at least the wire including the inline fuse through wire channels formed on the second side of the base so that the inline fuse is received by the fuse receptacle.

17. The method of claim 16, further comprising:
placing a fuse cover over the inline fuse enclosing it in the fuse receptacle.

18. The method of claim 16, further comprising:
attaching the second end of each wire to a connector for connecting the wire harness to a vehicle harness.

19. The method of claim 16, wherein the receptacle assembly further includes an internal receptacle extending from the base in the second direction, the internal receptacle defining an internal cavity within which the fuse receptacle, apertures and wire channels are located.

20. The method of claim 19, further comprising:
depositing potting material into the internal receptacle over the fuse receptacle and plurality of wires; and
molding the potting material to the receptacle assembly to seal the terminals, the inline fuse, and the plurality of wires to the second side of the base.

* * * * *